US011310642B2

(12) United States Patent
Dowlatkhah et al.

(10) Patent No.: US 11,310,642 B2
(45) Date of Patent: *Apr. 19, 2022

(54) FACILITATION OF DYNAMIC EDGE COMPUTATIONS FOR 6G OR OTHER NEXT GENERATION NETWORK

(71) Applicants: AT&T Mobility II LLC, Atlanta, GA (US); AT&T Intellectual Property I, L.P., Atlanta, GA (US)

(72) Inventors: Sangar Dowlatkhah, Cedar Hill, TX (US); Zhi Cui, Sugar Hill, GA (US); Paul Smith, Jr., Heath, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,144

(22) Filed: Sep. 30, 2020

(65) Prior Publication Data

US 2021/0266716 A1 Aug. 26, 2021

Related U.S. Application Data

(63) Continuation of application No. 16/802,060, filed on Feb. 26, 2020, now Pat. No. 10,827,329.

(51) Int. Cl.
*H04W 8/24* (2009.01)
*G06F 8/61* (2018.01)
(Continued)

(52) U.S. Cl.
CPC ............... *H04W 4/50* (2018.02); *H04W 4/70* (2018.02); *H04W 8/005* (2013.01); *H04W 8/20* (2013.01);
(Continued)

(58) Field of Classification Search
None
See application file for complete search history.

(56) References Cited

U.S. PATENT DOCUMENTS 9,509,628 B2 11/2016 Moeller
9,635,057 B2 4/2017 Bone et al.
(Continued)

FOREIGN PATENT DOCUMENTS

CN 109361771 A 2/2019
EP 3 427 443 A1 1/2019
(Continued)

OTHER PUBLICATIONS

Datta, et al. "A lightweight framework for efficient M2M device management in oneM2M architecture", 2015 International Conference on Recent Advances in Internet of Things {RIoT). IEEE, 2015. 6 pages.

(Continued)

*Primary Examiner* — Gary Lafontant
(74) *Attorney, Agent, or Firm* — Amin, Turocy & Watson, LLP

(57) ABSTRACT

Peripheral devices such as wearables can link to mobile devices to access network elements. These peripheral devices can comprise a communication part and a processing part. Each of these parts, specially the processing part of the next item in a communication chain, can be multiple times larger and stronger than the previous linked item. For instance, the peripheral device can be connected to the mobile device which can be in line connected to an NodeB device. Because the processing power of mobile device can be several times stronger than the peripheral, a mobile edge computing platform and a multi-access application function (Continued)

facilitate sharing of processing power capabilities between the peripheral devices, mobile devices, and/or the NodeB devices.

20 Claims, 10 Drawing Sheets

(51) Int. Cl.
| | |
|---|---|
| *H04W 4/50* | (2018.01) |
| *H04W 4/70* | (2018.01) |
| *H04W 8/20* | (2009.01) |
| *H04W 8/00* | (2009.01) |
| *H04W 28/02* | (2009.01) |
| *H04B 7/0413* | (2017.01) |

(52) U.S. Cl.
CPC ....... *H04W 28/0221* (2013.01); *H04B 7/0413* (2013.01)

(56) References Cited

U.S. PATENT DOCUMENTS

| | | | |
|---|---|---|---|
| 10,007,911 | B2 | 6/2018 | McDonald |
| 10,009,707 | B2 | 6/2018 | Ly et al. |
| 10,321,311 | B2 | 6/2019 | Sasin et al. |
| 10,382,394 | B2 | 6/2019 | Sasin et al. |
| 10,455,057 | B2 | 10/2019 | Mathison et al. |
| 10,827,329 | B1 * | 11/2020 | Dowlatkhah ......... H04W 8/005 |
| 2015/0109917 | A1 | 4/2015 | Lu et al. |
| 2017/0048336 | A1 | 2/2017 | Novo et al. |
| 2017/0208457 | A1 | 7/2017 | Shao |
| 2017/0279686 | A1 | 9/2017 | Shao et al. |
| 2017/0279688 | A1 | 9/2017 | Shao |
| 2017/0351508 | A1 | 12/2017 | Jahn et al. |
| 2018/0183897 | A1 | 6/2018 | Singhal |
| 2018/0359621 | A1 | 12/2018 | Singhal et al. |
| 2019/0036875 | A1 | 1/2019 | Jimenez et al. |
| 2019/0182661 | A1 | 6/2019 | Yokota |
| 2019/0222653 | A1 | 7/2019 | Dauneria et al. |
| 2019/0319917 | A1 | 10/2019 | Jimenez et al. |

FOREIGN PATENT DOCUMENTS

| | | |
|---|---|---|
| KR | 10-20190048769 A1 | 5/2019 |
| WO | 2015/149531 A1 | 10/2015 |
| WO | 2017/153093 A1 | 9/2017 |
| WO | 2019/009263 A1 | 1/2019 |
| WO | 2019/114972 A1 | 6/2019 |
| WO | 2019/233275 A1 | 12/2019 |

OTHER PUBLICATIONS

Prado. "OMA Lightweight M2M Resource Model." IAB IoT Semantic Interoperability workshop 2016. 5 pages.

Robles, et al. "Design of a Performance Measurements Platform in Lightweight M2M for Internet of Things." IRTF & ISOC Workshop on Research and Applications of Internet Measurements (RAIM). 2015. 4 pages.

Municio, et al. "Whisper: Programmable and Flexible Control on Industrial IoT Networks." Sensors 18.11 (2018):4048., 24 pages.

Tracey, et al. "How to see through the Fog? Using Peer to Peer (P2P) for the Internet of Things." 2019 IEEE 5th World Forum on Internet of Things (WF-IoT). IEEE, 2019. 6 pages.

Notice of Allowance received for U.S. Appl. No. 16/802,060 dated Aug. 18, 2020, 36 pages.

* cited by examiner

FACILITATION OF DYNAMIC EDGE COMPUTATIONS FOR 6G OR OTHER NEXT GENERATION NETWORK

RELATED APPLICATION

The subject patent application is a continuation of, and claims priority to U.S. patent application Ser. No. 16/802,060 (now U.S. Pat. No. 10,827,329), filed Feb. 26, 2020, and entitled "FACILITATION OF DYNAMIC EDGE COMPUTATIONS FOR 6G OR OTHER NEXT GENERATION NETWORK," the entirety of which application is hereby incorporated by reference herein

TECHNICAL FIELD

This disclosure relates generally to facilitating dynamic edge computations. For example, this disclosure relates to facilitating dynamic edge computations and internet of things (IoT) for a 6G, or other next generation network, air interface.

BACKGROUND

Microservices are a software development technique—a variant of the service-oriented architecture (SOA) architectural style that structures an application as a collection of loosely coupled services. In a microservices architecture, services are fine-grained and the protocols are lightweight. The benefit of decomposing an application into different smaller services is that it improves modularity. This makes the application easier to understand, develop, test, and become more resilient to architecture erosion. It parallelizes development by enabling small autonomous teams to develop, deploy and scale their respective services independently. It also allows the architecture of an individual service to emerge through continuous refactoring. Microservice-based architectures enable continuous delivery and deployment.

The above-described background relating to facilitating dynamic edge computations is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
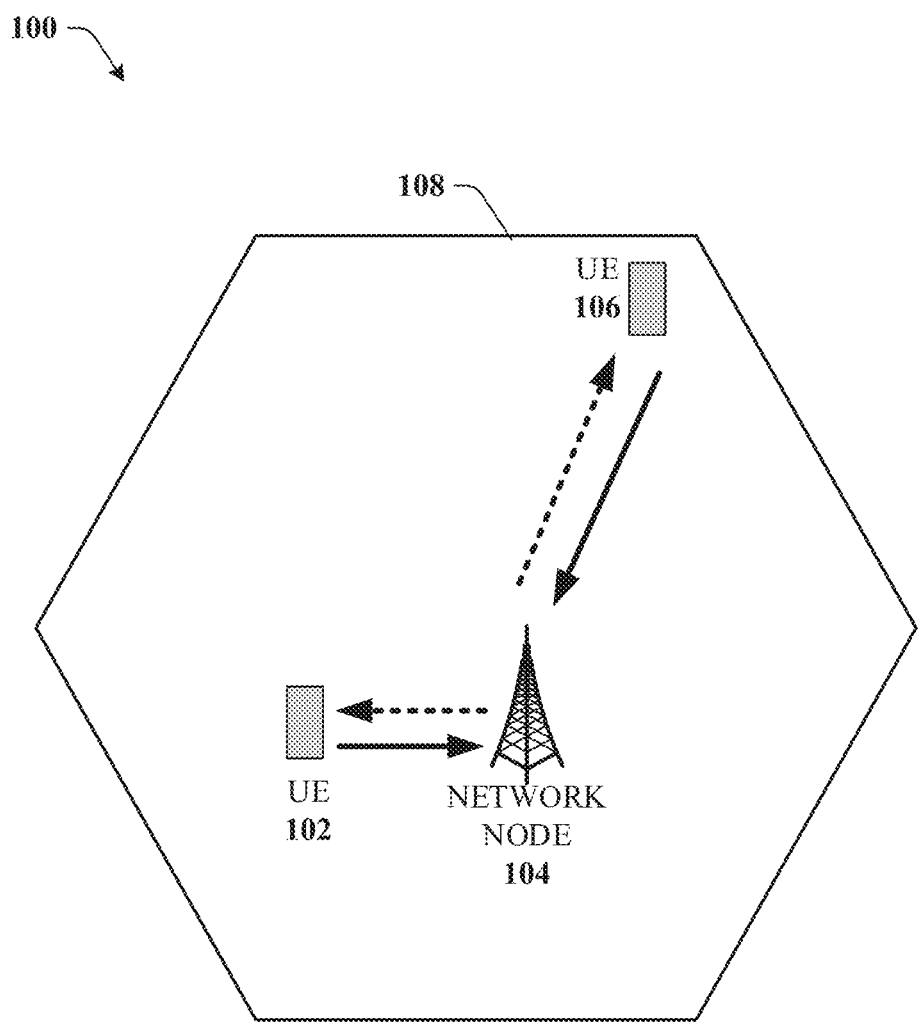
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate dynamic edge computations for a 6G interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 6G, the disclosed aspects are not limited to 6G, a UMTS implementation, and/or an LTE implementation as the techniques can also be applied in 3G, 4G, 5G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate dynamic edge computations for a 6G network. Facilitating dynamic edge computations for a 6G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service (QoS) and traffic management and routing can be synchronized and managed end to end.

An LTE network can be a policy-based traffic management architecture with a PCRF element traditionally controlling the QoS levels and other information (priorities bandwidths, etc.) that manages IP flows that carries a particular application (such as voice, video, messaging, etc.). This policy-based mechanism applies to the IP traffic between the mobile device and the packet data network gateway ("PGW"). In an embodiment of the subject disclosure, software defined networking can be used to provide routing and traffic control for packets sent from the PGW to a destination address. In some embodiments, the SDN controller can also provide traffic control for packets from the mobile device to the destination in some embodiments.

The PCRF and the SDN controller can also communicate about some aspects of a particular application flow so that routing decisions both in the access network (between NodeB and PGW) as well as in the backbone can be made based on the nature of the application and how that particular flow was expected to be treated based on operator policies and user subscription. For example, if a higher QoS is to be applied to a traffic flow carrying voice packet, the service related information such as QoS can be used by SDN controller to make decisions such as mapping and route optimizations. This can enable the entire network to be application aware with a consistent treatment of the packets.

Radio access network abstraction can provide a separation between the physical radios and a logical view of the network. It can provide a holistic view of a pool of various radio resources from various radio technologies. This can allow a network controller to make an intelligent decision on what radio to use to deliver a service based on application requirements. The radio access network abstraction can also have a dynamic learning capability to constantly update the network view of the radio resources upon adding, changing, removing and/or modifying the resources.

A 6G network has the ability to dedicate an edge slice with the capability to intelligently perform edge computing of a large number of information on demand. In a 6G network, microservice enabled solutions can bypasses the core network. Additionally, after an initial provisioning, the network can autonomously communicate with connected parties. This solution can utilize a dynamic handling request for packet propagation. Dynamic means that the handling request can change depending on the distance the packet has to travel, time associated with travel, time of day, time of year, etc.

For example, if a packet is set to travel via the network and interact with several nodes, the sending node can create a profile for the packet and attach a packet profile to the packet according to packet characteristics. The packet profile can comprise initial packet profile characteristics and be distributed within a 6G edge slice tailored for a specific service associated with the packet. Once the packet is ready to be sent, the packet profile can be sent, with and/or in advance of the packet itself, to downstream nodes. Consequently, each node can be informed and updated with every reading of the packet and the possibility of a false positive with regards to the packet characteristics can be mitigated or eliminated.

In a 6G network, microservices can be utilized as an alternative to the core network. For example, after a device is on-boarded (e.g., path set-up, authentication, level of service, etc.) to the network, the microservices can facilitate internetwork communication. Thus, microservices can perform certain functions without the core network (e.g., changing prices, latency mitigation, etc.).

In a modern access network with numerous access technology connecting billions of devices to the core agnostic network, there are certain intelligence that can be used at the access to accommodate the services to communicate with subscriber UE devices. These UE devices can be simple as a connected light bulb or a complicated and integrated connected car on board unit (OBU) with sub processors integrated to various integral parts of a vehicle. Some of these services running on the UEs can either be tailored to specific applications running on the edge of the network or information that need to enable services are available at the edge or at the mobile edge computing (MEC).

As the number of Internet of things (IoT) devices, information that these devices are collecting is also increasing. However, increasing amounts of data can require a proportional increase in the amount of processing power, which in line, can require stronger and more expansive hardware. In a 6G network, most of processing power (including core network) is moving towards the edge of the network. This can be used to enhance IoT devices' processing capabilities and reduce power consumption of IoT/UE devices.

While a 6G network can access an agnostic core, information/data can be collected and processed by a service provider. However, the ability to process the information and trigger a certain procedure becomes increasingly hardware intensive. Thus bigger and stronger processing power can be needed at a particular location rather than treating the information offsite.

There are a vast number of ways information can be collected from sensory devices such as wearables, smart home connected devices, connected cars, etc. Each of these devices are generally in line connected to a either a UE (such as smart phone), tablet, or home gateway, which are in line connected to a radio access network (RAN), a mobile edge computing (MEC) device, and a core network, respectively. Each of these links from the wearable, to UEs, to access network elements can comprise two parts: a communication part and a processing part. Each of these parts, especially the processing part, of the next item in the communication chain can be multiple times larger and stronger the previous linked item. For instance, a wearable such as Fitbit can be connected to the UE, which can be in line connected to an NodeB. The processing power of UE is several fold stronger then the wearable, the NodeB is proportionally a lot stronger then the UE, and the MEC can have almost unlimited processing power. Thus, the mostly idle processing power in a 6G network can be taken advantage of.

The edge computing VM can provide enough power to the device within a bottoms up scheme. From a tops down scheme, a subscriber can subscribe to an application and there is no way that the application can be run on the UE (e.g., an Xbox game running on the mobile device), so the game has to be run on the cloud and sent to one or more UEs. If the UE is incapable of running an application, it can use other adjacent devices to alleviate the processing power. The request for processing can go to one or more next devices. The management plane can manage which devices receive which processing resources (e.g., power, how much can be used, who receives it, etc.).

The UE can be programmed to send control messages to the network stating that it is beginning a new process. The network can know how much processing power the new process can require and thus create a slice to be able to service the UEs session for the new process. Devices that are assisting in this process can pull data from and store data within a data store. An aggregation component associated with the repository can gather data and combine the resources to fulfill the new process. The aggregation component can reside on the UE and/or in the network. The ability to get the device to communicate the need for processing and spread this information on various processing devices and aggregate it the data and send it back to the device.

For example, a door sensor may need to process data that it received for the day and provide data on what that data might looks like tomorrow. Thus, it can send the processing request to a gateway, the gateway can instantiate the virtual machine (VM), get the information, crunch it, and send it back to the door sensor and disengage the VM. The gateway device itself can have processing power. However, if more processing power is needed, the gateway device can send the request upstream to request additional processing power resources.

In some embodiments, the MEC can be utilized as the gateway device that sits on the edge of the network such that if UEs can access it, it can be utilized for processing. If the MEC does not comprise the needed processing function, it can communicate with the network to open a VM session to get the software that it needs to compile the data.

In one embodiment, described herein is a method comprising receiving, by a first wireless network device comprising a processor from a mobile device, request data representative of a request for a processing resource. In response to the receiving the request data, the method can comprise transmitting, by the wireless network device, the request data to a second wireless network device to fulfill the request for the processing resource. In response to the transmitting the request data, the method can comprise receiving, by the first wireless network device, the processing resource. Furthermore, the method can comprise transmitting, by the first wireless network device, the processing resource to the mobile device in response to the receiving the processing resource.

According to another embodiment, a system can facilitate, receiving control message data representative of a control message indicating that a mobile device is initiating a process. In response to the receiving the control message data, the system can comprise transmitting the control message data to a wireless network device, of wireless network devices, to fulfill a request for a processing capability applicable to the process. In response to the transmitting the control message data, the system can comprise receiving the processing capability. Additionally, in response to the receiving the processing capability, the system can comprise facilitating performance of the process for the mobile device.

According to yet another embodiment, described herein is a machine-readable medium that can perform the operations comprising receiving control message data representative of a control message indicating that a mobile device is initiating a process. In response to the receiving the control message data, the machine-readable medium can perform the operations comprising transmitting the control message data to a wireless network device, of a wireless network, to fulfill a request for a processing capability for the process. In response to the transmitting the control message data, the machine-readable medium can perform the operations comprising receiving the processing capability. Furthermore, in response to the receiving the processing capability, the machine-readable medium can perform the operations comprising facilitating performance of the process for the mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
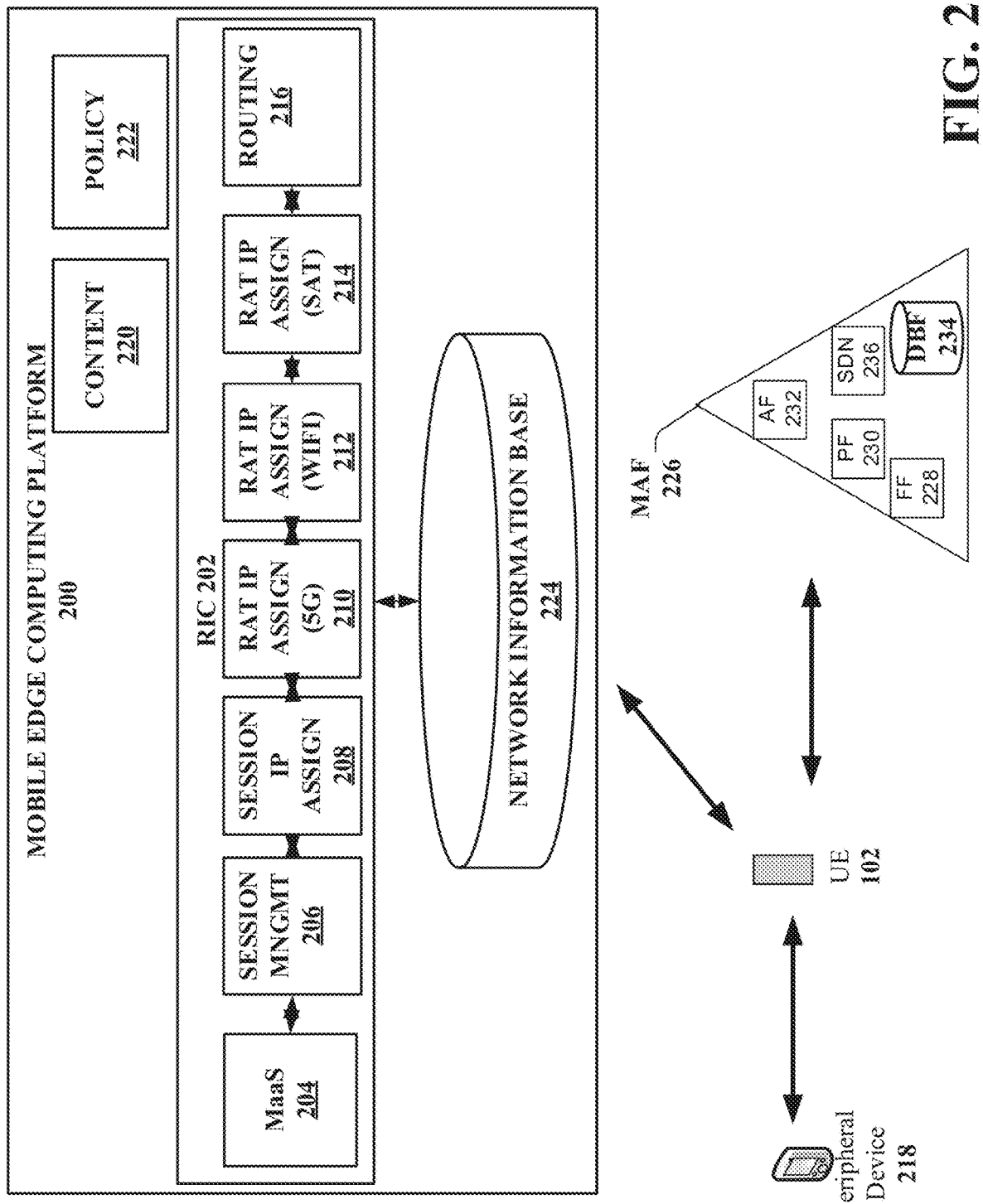
FIG. 2 illustrates an example schematic system block diagram of mobile edge computing platform according to one or more embodiments.

Referring now to FIG. 2, illustrated is an example schematic system block diagram of an example schematic system block diagram of mobile edge computing platform according to one or more embodiments. A radio access network intelligent controller (RIC), found within a mobile edge computing (MEC) platform 200, can comprise several microservices to increase system efficiencies. The RIC can also have direct access to subscribers via a direct line of communication and delegate the traffic to different processors.

For example, the mobility as a service (MaaS) function 204 can determine how to treat traffic based on a mobility state (e.g., moving, non-moving, rate of speed, etc.) of the UE 102. The session management function 206 can maintain session continuity regardless of where the UE 102 is located within the network. For example, if a user is talking, then the session management function 206 can ensure that the session is not dropped. However, if the user is checking an email, then session continuity does not need to be maintained to receive the email. The session IP assignment function 208 can be used to maintain session continuity as well. Although a physical IP address can be changed, the session layer of the IP address cannot be changed. Thus, the RIC can comprise a microservice that provides the session IP address assignment. A radio access technology (RAT) IP assignment function 210 is for a physical layer IP that can be used for mobility management. If the UE 102 connects to Wi-Fi (e.g., RAT IP Assign Wi-Fi 212) and/or satellite (e.g., RAT IP Assign Sat 214, then there can be a corresponding IP address assigned to the UE 102. However, no matter which technology or the mobility status of the UE 102, the packet data can still be routed (e.g., tunnel-based routing, IP connection-based routing, etc.) via the routing function 216.

The network information base 224 can maintain the state of the RAN (whether the network is congested or not) and the state for each device (e.g., the radio link conditions of each UE 102). A wireless network device operated by the service provider can comprise a policy that can determine which microservices should be utilized under certain conditions and in what order (e.g., sequence) the microservices should be executed. Within the MEC platform 200, local content 220 can be hosted to improve the performance, reduce latency, and reduce the transport time.

A wireless network device can receive inputs from the policy function 222 to provide guidance on what policies the wireless network device should allocate based on certain triggers. The wireless network device can have access to the network state, the UE 102 state, and an inventory of microservices. There are various network resource management functions that can address specific aspects of the network (e.g., load balancing functions, handover functions, antenna function, power control functions, etc.). The wireless network device can provide dynamic allocation of microservices instead of predefined decisions. A wireless network device can dynamically output a policy to the policy function 222, based on the network state, and/or the UE 102 state and determine which trigger conditions to apply to allocation of microservices and in what order the microservices should be allocated. This data can then be communicated to the RIC.

The policy can be received from a wireless network device and can have intelligence to make decisions about what microservices to use and in what order. The policy can also reside on multiple layers of the system: open network automation process (ONAP), RIC, core, and other areas. The policy from a service level agreement (SLA) can also affect user configuration on their devices. Thus, the dynamic policy can decide which services and what level to be exercised. Machine learning (ML) can reside within the policy. The ML can review the outcomes from previously applied policies as a feedback and make a decision at any time based on network congestion, SLA, premium customers, services with additional features etc. In an alternative embodiment, the ML can also be hosted on the ONAP platform and then ONAP platform can communicate with the RIC and the policy.

A multi-access application function (MAF) component 226 can comprise a filter function component 228, a processing function (PF) component 230, an application function (AF) component 232, a database function (DBF) component 234, which can all be communicatively coupled. The MAFs component can comprise additional data that is specifically related to a subscriber (e.g., UE 102). The MAF can be a subset of the MEC (on data centers) that is on the edge or bleeding edge (e.g., a few feet from the device rather than the edge of the network). For example, the MAF component 226 can handle very detailed data exchanges between the UE 102 and the MEC component 200. The MAF component 226 can comprise functionality allowing related applications and/or processing capabilities to be ported and/or cascaded to other MAF components following a subscriber's physical movements. The FF component 228 can decide what data will be sent to the UE 102 (e.g., is the data to old as a function of time and location). For example, some mobile application data may need to be sent to the service provider for authentication and/or other purposes, and other data can be filtered out to be exchanged via multiple MAF components. Furthermore, the PF component 230 comprises information that can be updated with the SLA (e.g., dynamic changes to the policy via the user or carrier can be transferred/updated at the PF component 230) and other variables such as user-defined data, and carrier core policy data. The PF component 230 can delegate processing functions to the AF component 232, which can instantiate necessary applications. Thus, the FF component 228 can use the information from the PF component 230 to filter data to and from the service providers. Thus, the MAF component 226 can utilize the DBF function 234 to store data about the AF 232, crunch data, and send the data to other databases.

A peripheral device 218 (e.g., wearable device) can be attached to the UE 102, which can in turn be attached to the MEC 200. Although the peripheral device 218 does not have the processing power of the UE 102 or the MEC 200, if needed, additional processing power can be provided from the MEC down to the peripheral device 218 from the UE 102 by way of the MAF. Thus, the peripheral device 218 can use other adjacent devices to alleviate its lack of processing power for specific applications. This allocation of processing power can be based upon the MAF component 226 and the functions that it comprises. The request for processing can go to one or more next devices. The management plane can manage which devices receive which processing resources (e.g., power, how much can be used, who receives it, etc.).

For example, the peripheral device 218 can be programmed to send control messages to the network stating that it is beginning a new process. Thus, the MEC 200 can know how much processing power the new process can require and thus create a slice to be able to service the peripheral device 218 session for the new process. Devices that are assisting in this process (e.g., UE 102) can pull data from and store data within a data store. An aggregation component (which can also be found in the MEC 200 and or the MAF component 226) associated with the repository can gather data and combine the resources to fulfill the new process. The aggregation component can reside on the UE 102, the peripheral device 218, and/or in the network.

Figure 3:
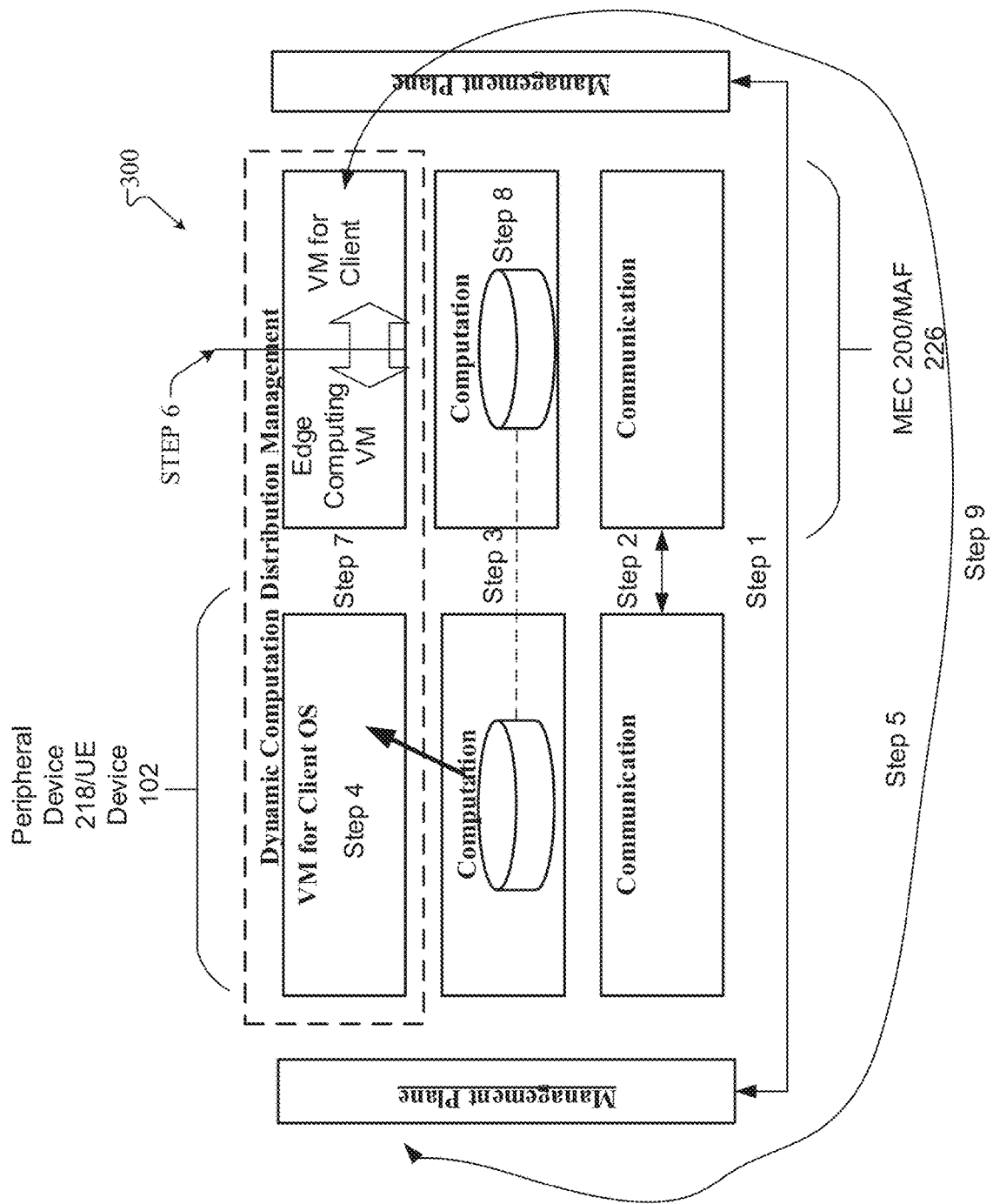
FIG. 3 illustrates an example schematic system block diagram of mobile edge computing platform according to one or more embodiments.

Referring now to FIG. 3, illustrated is an example schematic system block diagram of an example schematic system block diagram of mobile edge computing platform according to one or more embodiments. At step 1 the management plane can communicate with every layer of the devices (e.g., peripheral, UE, MEC, MAF), and at step 2 the communication plane can send communication between the devices on what needs to be processed via a radio link. At step 3, data can be stored on the computation databases of the devices, and at step 4, information can be sent to the VMs on the client OS and the serving device OS. At step 5, the peripheral/UE device can request the processing resources from the MAF/MEC. At step 6, request data can be processed by the MAF/MEC and at step 7, the dynamic content distribution management can pool the processing power between servers (on the right), store the data in the MAF/MEC computation databases and provide the processing power to the peripheral/UE device at step 9.

Figure 4:
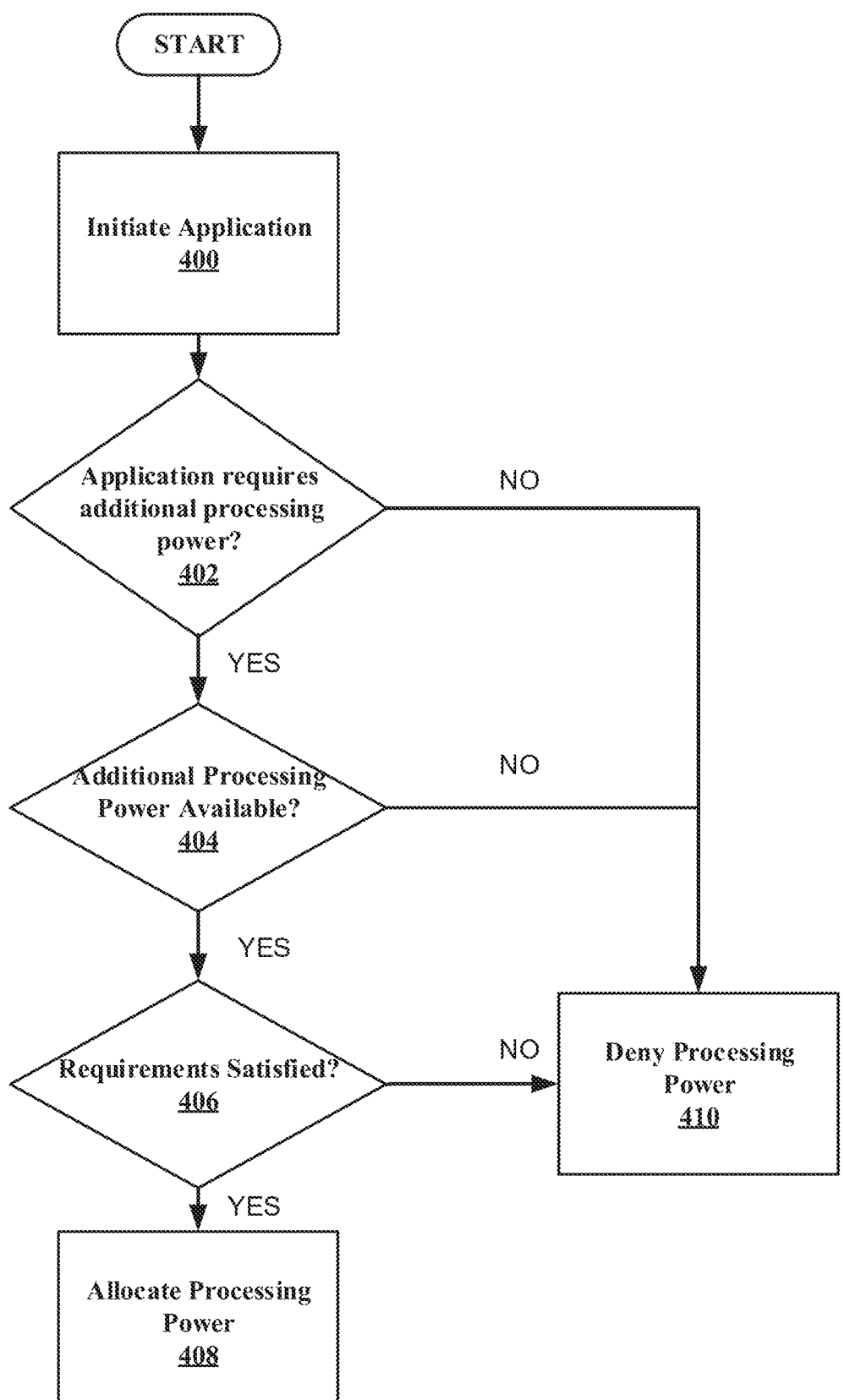
FIG. 4 illustrates an example schematic system block diagram of flow diagram for facilitating dynamic edge computations for according to one or more embodiments.

Referring now to FIG. 4, illustrated an example schematic system block diagram of flow diagram for facilitating dynamic edge computations for according to one or more embodiments. At block 400, after the peripheral device 218 instantiates a new application, the system can check to determine if the peripheral device 218 has enough processing power or requires additional processing power to run the application at block 402. If the application does not require additional processing power, then the MAF can deny allocating any additional processing power at block 410. However, if the application does require additional processing power, the additional processing power is available (via a linked device) at block 404, and requirements are satisfied (e.g., SLA, location, device type, etc.) at block 406, then the PF component 230 can delegate processing functions to the AF component 232, which can instantiate necessary applications by allocating the processing power at block 408. Alternatively, if the requirements are not satisfied at block 406 and/or the additional processing power is unavailable at block 404, then the system can deny allocating additional processing power at block 410.

Figure 5:
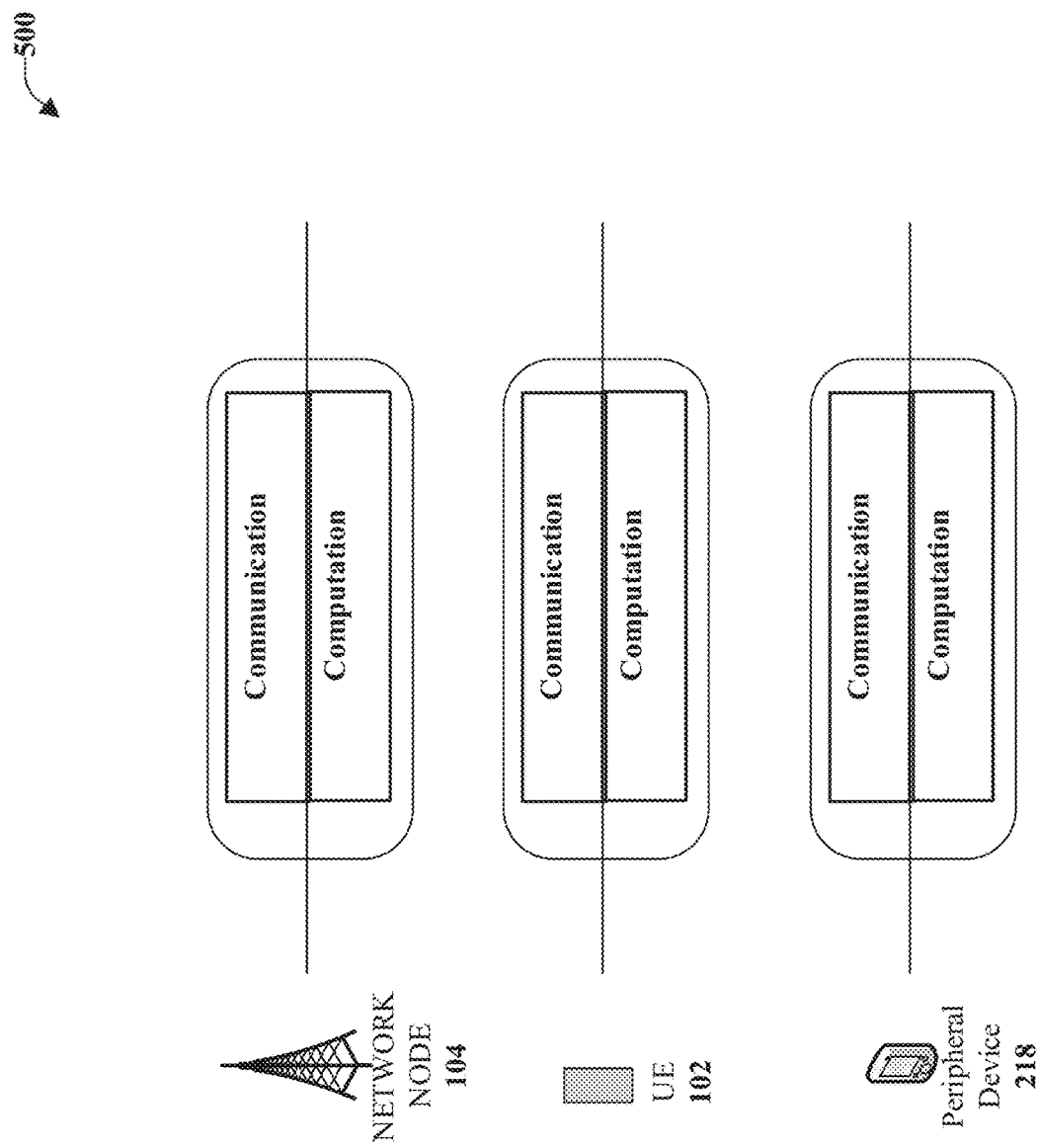
FIG. 5 illustrates is an example schematic system block diagram horizontal and vertical slicing according to one or more embodiments.

Referring now to FIG. 5 illustrated is an example schematic system block diagram horizontal and vertical slicing 500 according to one or more embodiments. FIG. 5 depicts both horizontal and vertical slicing combined. The difference between vertical slicing and horizontal slicing is that horizontal slicing takes into account the complete network, and vertical slicing takes pieces of a given layer and places them on slices that are able to cooperate and work with each other on a certain scale. For example, in 6G, battery life can be an issue due to processing large amounts of data. Utilizing a multi-access edge computing functions, an end-user device can trigger a power processing procedure and ask for a communication slice from the management plane.

Figure 6:
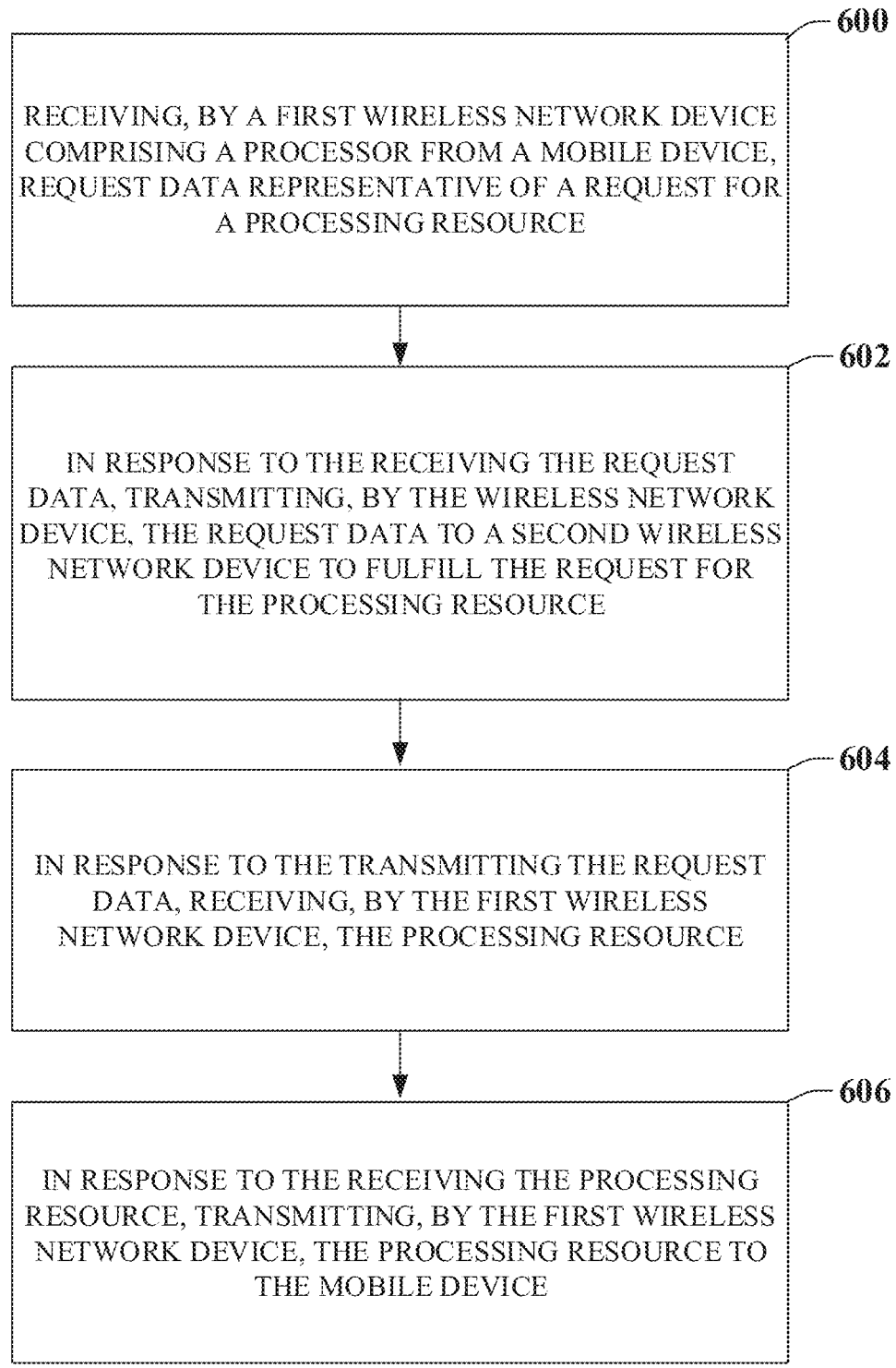
FIG. 6 illustrates an example flow diagram for a method for facilitating dynamic edge computations for a 6G network according to one or more embodiments.

Referring now to FIG. 6, illustrated is an example flow diagram for a method for facilitating dynamic edge computations for a 6G network according to one or more embodiments.

At element 600, the method can comprise receiving, by a first wireless network device comprising a processor from a mobile device, request data representative of a request for a processing resource. In response to the receiving the request data, at element 602, the method can comprise transmitting, by the wireless network device, the request data to a second wireless network device to fulfill the request for the processing resource. In response to the transmitting the request data, at element 604, the method can comprise receiving, by the first wireless network device, the processing resource. Furthermore, at element 606, the method can comprise transmitting, by the first wireless network device, the processing resource to the mobile device in response to the receiving the processing resource.

Figure 7:
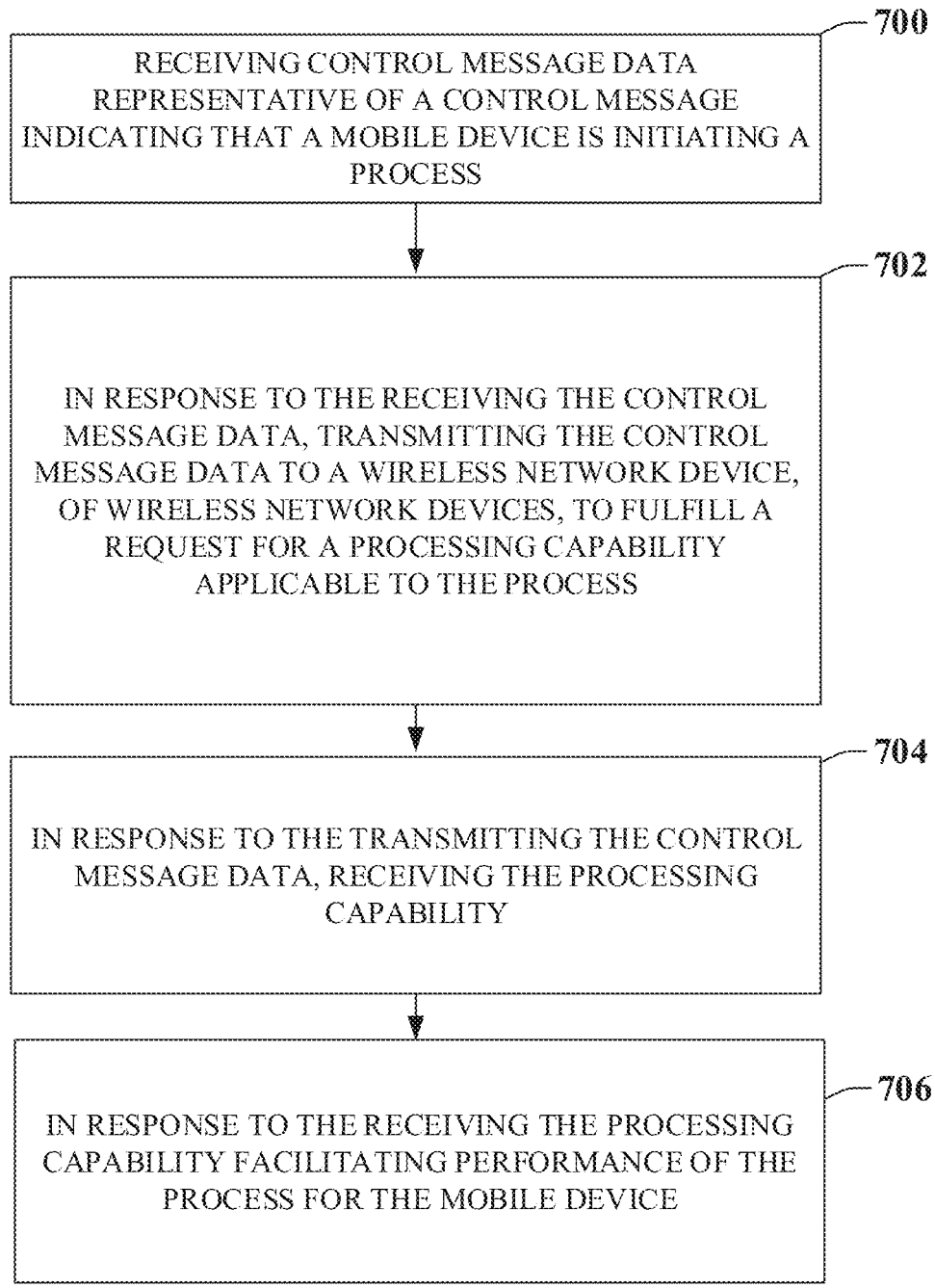
FIG. 7 illustrates an example flow diagram for a system for facilitating dynamic edge computations for a 6G network according to one or more embodiments.

Referring now to FIG. 7, illustrated is an example flow diagram for a system for facilitating dynamic edge computations for a 6G network according to one or more embodiments. At element 700, the system can facilitate, receiving control message data representative of a control message indicating that a mobile device is initiating a process. In response to the receiving the control message data, at element 702, the system can comprise transmitting the control message data to a wireless network device, of wireless network devices, to fulfill a request for a processing capability applicable to the process. In response to the transmitting the control message data, the system can comprise receiving the processing capability at element 704. Additionally, at element 706, in response to the receiving the processing capability, the system can comprise facilitating performance of the process for the mobile device.

Figure 8:
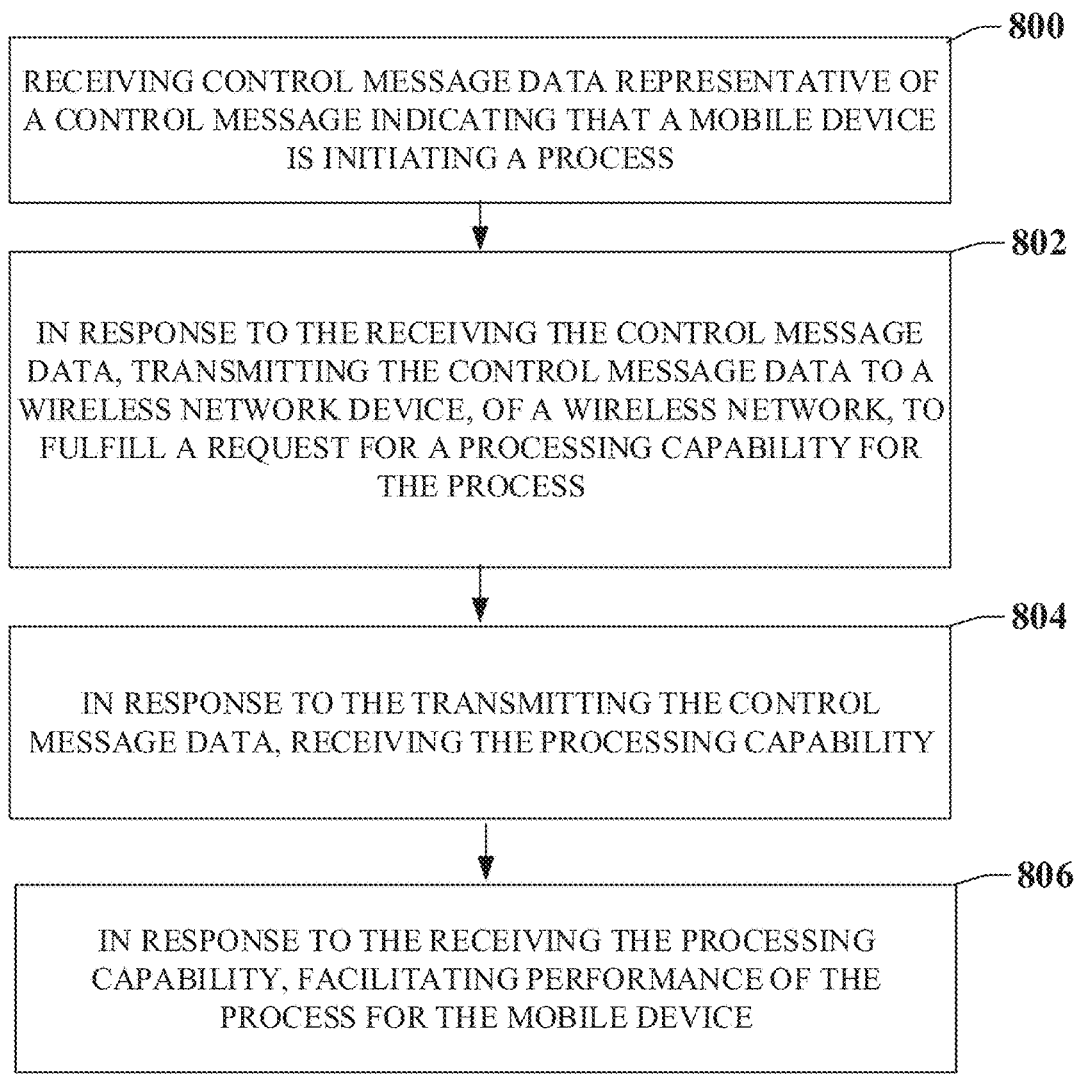
FIG. 8 illustrates an example flow diagram for a machine-readable medium for facilitating dynamic edge computations for a 6G network according to one or more embodiments.

Referring now to FIG. 8, illustrated is an example flow diagram for a machine-readable medium for facilitating dynamic edge computations for a 6G network according to one or more embodiments. At element 800, the machine-readable medium that can perform the operations comprising receiving control message data representative of a control message indicating that a mobile device is initiating a process. In response to the receiving the control message data, at element 802, the machine-readable medium can perform the operations comprising transmitting the control message data to a wireless network device, of a wireless network, to fulfill a request for a processing capability for the process. In response to the transmitting the control message data, at element 804, the machine-readable medium can perform the operations comprising receiving the processing capability. Furthermore, at element 806, in response to the receiving the processing capability, the machine-readable medium can perform the operations comprising facilitating performance of the process for the mobile device.

Figure 9:
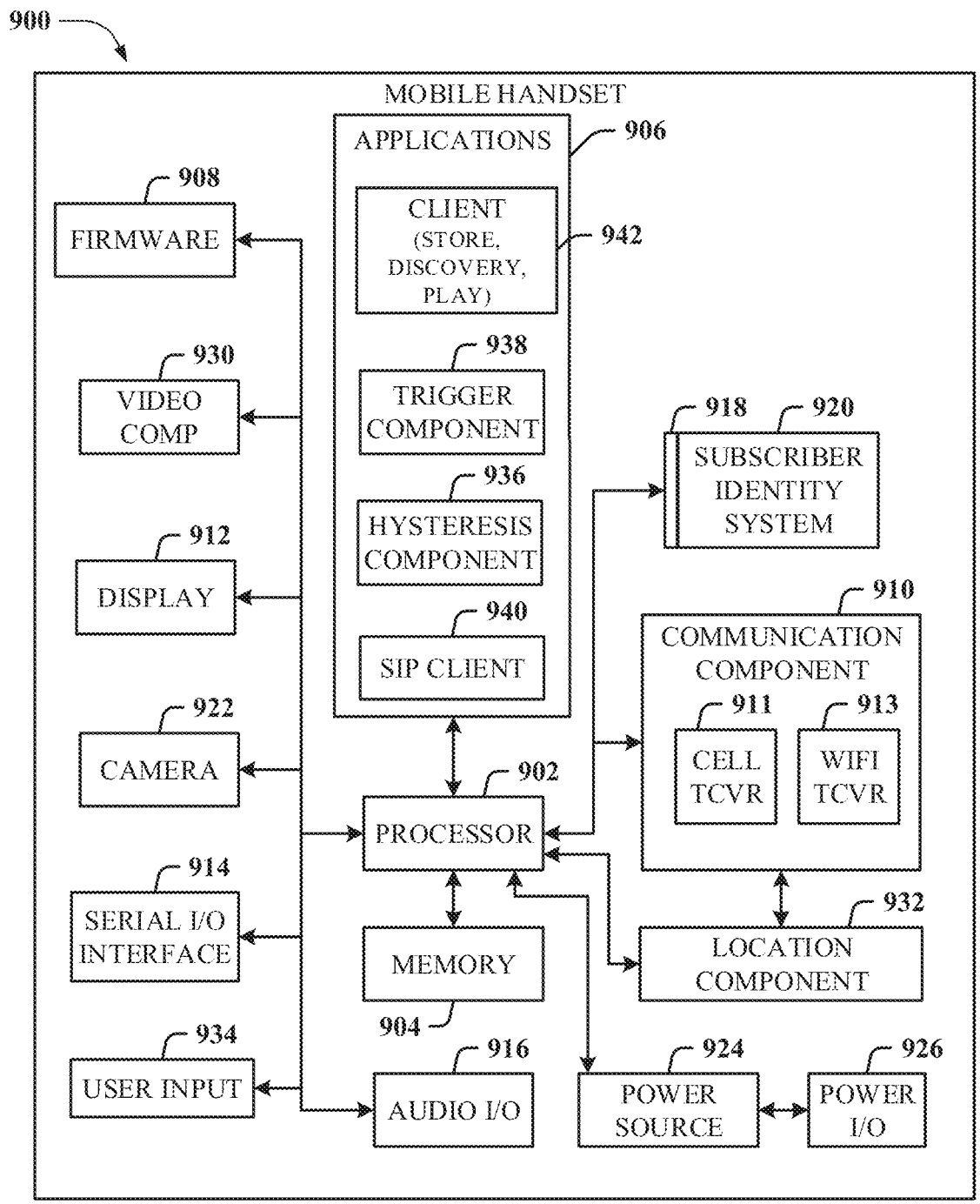
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
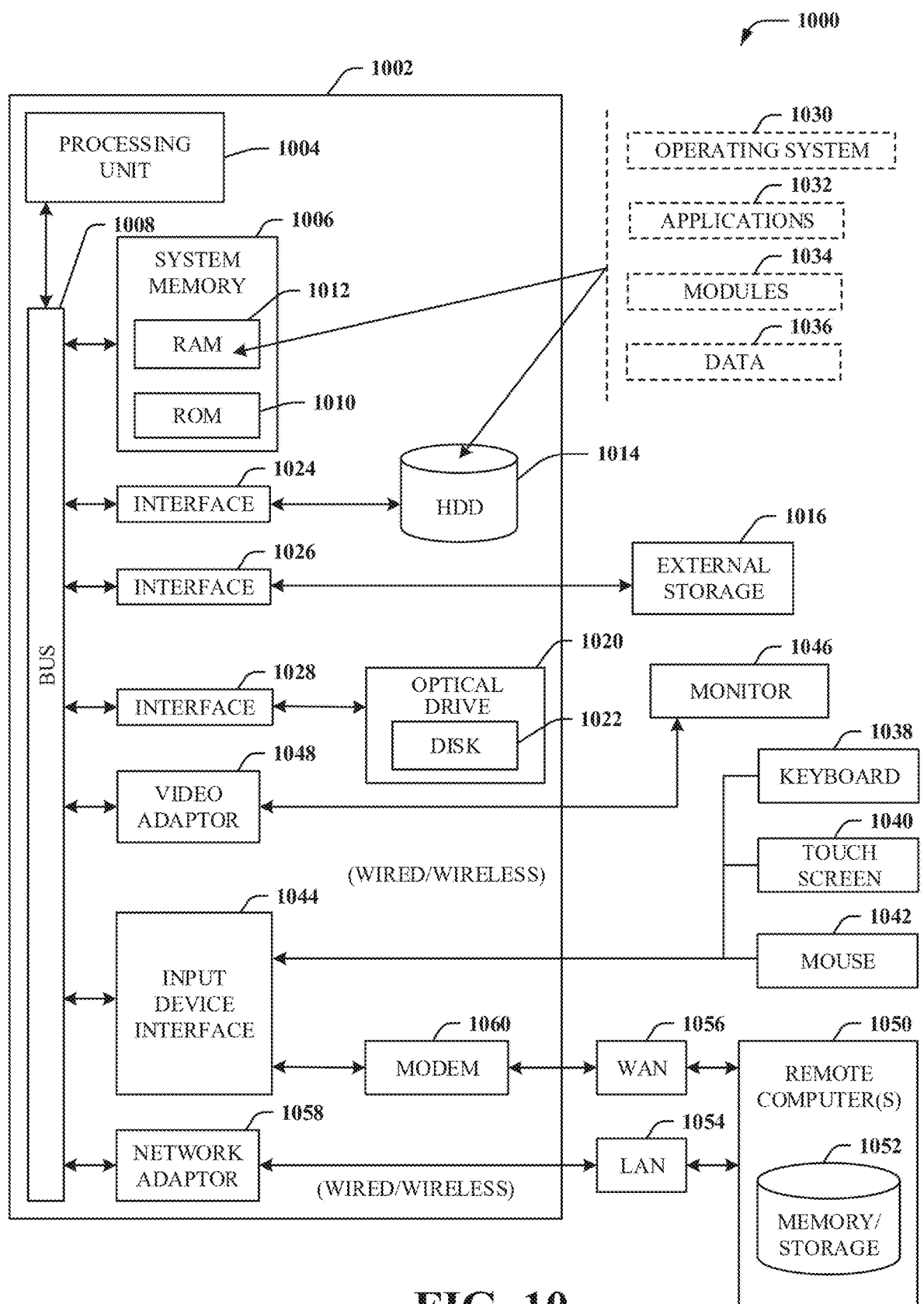
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, from a user equipment by first network equipment comprising a processor, request data representative of a request for a processing resource;
   in response to receiving the request data, transmitting, by the first network equipment, the request data to second network equipment to fulfill the request for the processing resource; and
   in response to receiving the processing resource, transmitting, by the first network equipment, the processing resource to the user equipment.

2. The method of claim 1, wherein receiving the request data representative of the request for the processing resource is in response to the user equipment initiating a mobile application.

3. The method of claim 1, further comprising:
   in response to transmitting the request data, receiving, by the first network equipment, the processing resource from a server device.

4. The method of claim 1, wherein the request data is received via a control message sent from the user equipment.

5. The method of claim 1, wherein the processing resource is additional power to be added to a processing capability of the user equipment.

6. The method of claim 1, wherein the user equipment is a first user equipment, and wherein the second network equipment is accessed via a second user equipment.

7. The method of claim 1, further comprising:
   in response to receiving the request data, generating, by the first network equipment, requirement data representative of an amount of the processing resource to be allocated to the user equipment.

8. A system, comprising:
   a processor; and
   a memory that stores executable instructions that, when executed by the processor, facilitate performance of operations, comprising:
   receiving control message data representative of a control message indicating that a user equipment is initiating a process;
   in response to receiving the control message data, transmitting the control message data to network equipment to fulfill a request for a processing capability applicable to the process; and
   in response to receiving the processing capability facilitating performance of the process for the user equipment.

9. The system of claim 8, wherein the processing capability is an increase in power to perform the process.

10. The system of claim 8, wherein the operations further comprise:
    transmitting the control message data to the network equipment.

11. The system of claim 8 wherein the operations further comprise:

in response to transmitting the control message data to the network equipment, receiving processing capabilities from the network equipment.

12. The system of claim 8, wherein the operations further comprise:
in response to receiving the processing capabilities from the network equipment, aggregating capabilities from the network equipment to fulfill the request for the processing capability.

13. The system of claim 8, wherein the processing capability is received from a server of the network equipment.

14. The system of claim 8, wherein the control message data is sent to a virtual machine device associated with a server.

15. A non-transitory machine-readable medium, comprising executable instructions that, when executed by a processor, facilitate performance of operations, comprising:
receiving control message data representative of a control message indicating that a mobile device is initiating a process;
in response to receiving the control message data, transmitting the control message data to network equipment to fulfill a request for a processing capability for the process; and
in response to receiving the processing capability, facilitating performance of the process on behalf of the mobile device.

16. The non-transitory machine-readable medium of claim 15, wherein the operations further comprise:
in response to transmitting the control message data, receiving the processing capability, wherein the processing capability is a processing speed.

17. The non-transitory machine-readable medium of claim 15, wherein the processing capability comprises processing speed functionalities from the network equipment.

18. The non-transitory machine-readable medium of claim 15, wherein the operations further comprise:
aggregating processing speed functionalities to fulfill the request for the processing capability.

19. The non-transitory machine-readable medium of claim 15, wherein initiating the process is associated with a subscriber application of the mobile device.

20. The non-transitory machine-readable medium of claim 15, wherein the process is performed in response to the request for the processing capability being fulfilled.

* * * * *